(12) United States Patent
Riedl et al.

(10) Patent No.: US 7,853,581 B2
(45) Date of Patent: Dec. 14, 2010

(54) DATA PROCESSING SYSTEM FOR THE PROCESSING OF OBJECT DATA

(75) Inventors: Bernhard Riedl, Heidenreichstein (AT); Thomas Neubauer, Vienna (AT); Oswald Böhm, Vienna (AT)

(73) Assignee: BRAINCON Handels-GmbH, Wien (AT)

( * ) Notice: Subject to any disclaimer, the term of this patent is extended or adjusted under 35 U.S.C. 154(b) by 530 days.

(21) Appl. No.: 11/986,157

(22) Filed: Nov. 20, 2007

(65) Prior Publication Data

US 2008/0320035 A1    Dec. 25, 2008

Related U.S. Application Data

(60) Provisional application No. 60/860,249, filed on Nov. 21, 2006.

(51) Int. Cl.
*G06F 17/00*    (2006.01)

(52) U.S. Cl. .................. 707/706; 707/722; 707/758; 707/781; 707/791; 707/802

(58) Field of Classification Search .......... 707/600–831
See application file for complete search history.

*Primary Examiner*—Isaac M Woo

(57) ABSTRACT

A data processing system for processing object data of a plurality of standard instances (101), where object identification data (100) and user data (110) in the object data database (20) can be stored and retrieved separately from each other so that no relationship between the object identification data (100) and the user data (110) can be derived from the stored data records alone, where at least one input device is provided which, after input of an allocated security code for the standard instance, permits access to the object identification data (100) of the assigned standard instance and to the associated user data (110), and the security code or a part thereof remains with the standard instance (101), with the recovery instance and if necessary with further instances (50, 60) determined by the standard instance.

20 Claims, 9 Drawing Sheets

DATA PROCESSING SYSTEM FOR THE PROCESSING OF OBJECT DATA

CROSS REFERENCE TO RELATED APPLICATION

This application claims benefit of U.S. Provisional Patent Application No. 60/860,249, filed Nov. 21, 2007, which is incorporated herein by reference in its entirety.

FIELD OF THE INVENTION

The invention relates to a data processing system for processing of object data of a plurality of standard instances, wherein the object data comprise object identification data and associated user data, comprising an object data database, in which the object data can be stored and retrieved via access devices.

BACKGROUND OF THE INVENTION

In this context, standard instances are to be understood as a person, a system or the like, for which data exist that are worthy of protection. These object data contain object identification data, which allow an object to be identified, e.g. through a person's Social Insurance Number or user data that were generated and stored in connection with the respective object.

Since a growing number of databases, e.g. with personal data, exist or are being generated, increasing efforts are being made in order to protect object specific data, such as personal particulars and data. On the other hand, personal data and the associated measurement and monitoring data as well as historical data are required for study purposes and for statistical analyses and for the implementation of legal provisions, e.g. in the health industry, which are then stored over extended periods for processing at a later date. The result is an increasing requirement for protection of stored data.

For that reason, the attempt has always been made to benefit from having as many data records available as possible, on the one hand, but not invade privacy, on the other. Existing approaches to solve the problem have therefore attempted to protect the data of each individual person, subject to data protection against access by unauthorized users.

However, existing systems do not offer adequate protection against tracing back data by means of comparison and thus do not prevent the possibility of drawing conclusions with respect to the identity of the standard instance by comparing the user data, e.g., the case history of a patient.

In existing data processing systems, this allocation is for instance centrally protected in the system by an access code, and/or through the use of a list. Thus anybody, who can obtain access to the data through this central access code, can access the entirety or large portions of all data stocks available. This not only presents problems in the event of a hacker attack against the system, but generally also raises the question as to who controls the data inventories in the system and whether the danger of unauthorized data dissemination by system operators can occur.

PRIOR ART

WO 2003/034294 A2 describes a system for processing of patient data which comprise the personal identification data of a patient and the associated health data, with a central location that contains a database for storing the anamnesis data, and with terminal devices that are connected with the central location for retrieving anamnesis data from the central database and/or for copying health data into the central database. The health data are stored in the central database without allocation to personal data, whereby an anamnesis data record of a patient has been assigned a data record identification code and which must be input in order to retrieve the anamnesis data record.

US 2005/0236474 A1 refers to a method for the processing of patient anamnesis data that guarantees confidentiality in order to comply with regulatory requirements. The security of the system used is based on a central service, implemented by means of a central index, which can be accessed by means of a role based access control model.

The commonality of the methods disclosed in WO 2003/034294 A2 as well as in US 2005/0236474 A1 consists in that both systems rely on the existence of a central location that maintains the association between identification data and user data. In WO 2003/034294 A2, the data identification codes are stored as a security option on a central pseudonymization computer, in order to facilitate the recovery of these very same data identification codes in the event of a loss of the original data identification codes, whereas in US 2005/0236474 A1, a central index is used not only for safeguarding but routinely for re-identification. The existence of a central index represents a weakness with respect to data integrity.

The system disclosed in DE 19925910 A1 is not based upon encoding and decoding the data on the central server itself or channel encoding, but provides that this occurs exclusively on the computer at the client. At the same time, the data, too, are completely or partially encrypted. The underlying public key infrastructure in DE 19925910 A1 is used exclusively for encrypting and decoding of the data, and can therefore not be used as an authorization model. Moreover there is the need for an architecture which does not solely rely on encryption, because for example medical data tends to be very large and thus encryption is a time-consuming operation.

US 2003/0074564 A1 describes an encryption system for the access to medical files, which doesn't contain any authorization process. Healthcare providers can therefore only edit or add data, if the patient is personally present and provides his or her own secret password. Moreover, a person who has the necessary identification code, which has been applied on a card in accordance with the process specification, can access the patient data.

BRIEF DESCRIPTION OF THE INVENTION

The object of the invention therefore is to create a data processing system of the type mentioned at the outset, which provides increased security against data abuse but still permits the allocation of personal identification data and user data over extended time periods, if necessary.

A further object of the invention is to specify a data processing system that enables access to user data of an object without revealing the object identification data of this object.

According to the invention this is achieved in that
the object identification data and the user data in the object data database can be stored and retrieved separately from each other, so that no relationship between the object identification data and the user data can be derived from the stored data records alone,
at least one input device is provided, which permits access to the object identification data of the assigned standard instance and to the associated user data after input of an allocated security code from the standard instance,
one or several allocated recovery instances outside of the object data database are defined for each of the standard instances, if necessary, through which this security code can be created again if it is lost, and that the security code or a part thereof remains with the standard instance and in addition remains with the recovery instance and/or with further instances specified by the standard instance or which can be accessed by it from these, if necessary.

In the method according to the invention, the security codes used, which are employed for the recovery of the associations, are split up decentralized on the system operators for safeguard in case of loss of the security codes which are held on the card, and are therefore not centrally stored. Thus, neither a centralized service nor a centralized index exists, by means of which a re-identification procedure can be executed. A further difference, e.g., as compared to the method according to WO 03/034294 A2, exists in that a multistage authorization concept is established by means of the method according to the invention.

In contrast to the known methods, in the method according to the invention the privacy of patients is protected to the extent that the association between the identification data and the user data is masked.

The security code can consist of various subcodes and be encrypted in itself. A sub security code can, for instance, decode another sub security code, which for its part has been made accessible to further instances or the recovery instances. This guarantees the protection of the data and in case of loss of the security code, the authorization for data access for the standard instance can be restored.

Two separated data groups are provided, i.e. the object identification data and the user data, which are assigned to the standard instances. The latter user data of a specific standard instance can be associated with object identification data of same only, if the security code allocated for the respective standard instance is applied.

In this manner, the data of each standard instance are protected by an individual security code, which preferably remains partially decentralized with the standard instance itself and/or with the recovery instance/s or other instances and cannot be centrally retrieved, and/or only after providing a security code. In case of loss or destruction of the standard instance's security code, access to the object data of the standard instance can, for instance, occur through the recovery instances.

According to one embodiment of the invention, several system operator instances can be present which are independent from each other, from which two or several system operator instances are defined as the recovery instance assigned to it in each case, without making the identity of the respective other selected system operator instance(s) and the standard instances known to the selected system operator instances, whereby at least two of the selected system operator instances can jointly access the object data and the associated user data for the respective standard instance.

The system operator instances are selected, e.g., in accordance with a principle of random selection, so that they are independent from each other, preferably spatially separated, and have no knowledge of one another as to which one safeguards one of the subcodes for which specific standard instance which permit joint access to the object data and user data of the assigned standard instance with one or the other subcodes, so that in this manner a new security code for the affected standard instance can be generated and allocated again.

The standard instance is the owner of its data in each case and has unlimited authorization to confer this authorization to other instances. In a further embodiment of the invention, further instances can thus be defined, which are authorized by the standard instances for full or partial data access.

Moreover, according to an embodiment of the invention, the further instances can comprise one or several associated instances, which in each case are authorized by one of the standard instances and have the same access authorization as these, and can authorize further instances.

In the hierarchy, such associated instance is located immediately below the standard instance, has access to all data of the standard instance, and may also, under controlled circumstances, provide this authorization to further instances.

It can also be provided that in another embodiment of the invention, the further instances comprise one or several authorized instances, which have been authorized by one of the standard instances in each case to access predefined entries in the object data database, which have been assigned to the respective standard instance, e.g. certain patient or health data in the object data database. The authorized instance can be authorized by the standard instance and also by the associated instance for limited access.

For the purpose of analysis of user data without authorization for access to object identification data, the further instances can comprise one or several research instances. The research instances can therefore only view user data.

In order to retrieve entries of user data from the object data database for a specific standard instance, each entry with user data in the object data database can be assigned an explicit user data identification.

For the retention of that part of the security code of a specific standard instance which remains with it, a wide variety of options exist.

According to a preferred embodiment of the invention, the security code or parts thereof can be stored on a security token, such as on a Smartcard which has a PIN code. In this way, even an extended security code of the user can be easily entered. Here, the standard instance logs on by pulling in the Smartcard and by entering the PIN code in the respective system and in this manner releases the security code stored on the Smartcard.

The security code remains with the standard instance and cannot be centrally viewed.

In a further development of the invention, the object data database can be comprised of two separate databases, whereby the object identification data are stored in the one database and the user data in the other database. Through this spatial separation of the data records of the system according to the invention, increased security is achieved.

The field of application of the invention is not limited in any way with respect to the type of object data. However, a potential application is for the object data database to be a personal data database and the object identification data are personal data, in particular, patient data.

As already previously mentioned, the security code can be developed in two or several parts so that an external key remains with the standard instance and this key can then be used in order to access the next closest internal key and/or makes this key accessible through decoding. This next closest internal key can in turn on its part access the next closest internal key, etc. This has the advantage that in case of a loss of the external key by the standard instance, a further instance can be authorized in order to access the next closest internal key and/or make it accessible by decoding. Access to the data is enabled by decoding through to the innermost hull or layer, whereupon a new external key can be developed again, which can be provided to the affected instance.

One embodiment of the invention can consist in that the security code of each of the standard instances can be developed from one or several inner and one or several external keys as well as a key for the respective user data record, whereby the user data and the object identification data of the respective standard instance are optionally encrypted with the internal key, whereby the external key remains with the standard instances in each case, the internal key remains with the recovery instances and the associated instances, if necessary, and the internal key with the associated external key, as well as the innermost key for the respective user data or data record is encrypted with the internal key. The respective codes for all instances can be selected the same or also different.

The invention moreover relates to a method for processing of object data of standard instances, which comprise object identification data and associated user data, in which the object data are stored in an object data database in one step, and one step is used to access the object data from the object data database and retrieve them.

As already described at the outset, the objective here also is to specify a method that offers increased data security together with high data usability while preserving the anonymity of the objects.

According to the invention this can be achieved by storing the object identification data and the user data in the object data database separately from each other in the memory step so that they can be retrieved separately from the object data database, but that no relationship between the object identification data and the user data can be derived from the stored data records alone, that one step is used to allocate security codes to each of the standard instances in order to provide access to the object identification data and the associated user data for each of the respective standard instances, where a recovery instance is defined for each of the standard instances, if necessary, through which in case the security code is lost, it can be created again, that each of the standard instances can permit further instances full or partial data access to its object data, and that in a query through one of the standard instances or a recovery instance and/or one of the further instances after input of the security code or part thereof, the object identification data in connection with the associated user data are accessible, if necessary.

The separate object identification data and the user data can only be assigned through the security code. In this case, the security code or a part thereof remains with the standard instance and can be restored through the recovery instance in case of loss or destruction, in order to prevent that the assignment of the identification data and the user data of the standard instance are permanently lost. Since the security code remains with the respective standard instance, the necessary codes for data access cannot be retrieved centrally and are therefore protected against unauthorized use.

The choice of a method for storing and managing the security codes is at the option of the user. It has been well proven, however, to store at least one part of the security code by means of encrypting in the system, where the recovery instance can also perform such encrypting so that it can generate the security code at least partially, if required.

One possibility for developing a recovery instance consists of selecting two or several system operator instances for each standard instance from several potential system operator instances that are independent of each other, without the identity of the respective other selected system operator instance(s) being known to the selected system operator instance(s), that the security code of the respective standard instance is also allocated to the two or several selected system operator instances, and where at least two selected system operator instances are available for joint access, and that in the query step, the object identification data in conjunction with the associated user data are accessed through the two or several system operator instances after joint input of the security code, if necessary. For the further improvement of security, the selected system operator instance(s) can operate spatially separated from each other.

The at least two system operator instances, defined in accordance with the principle of random selection, each have the possibility, e.g. through a security code, to jointly access the inner part of a security code of a standard instance, in order to query the object identification data and the user data of the standard instance. If needed, the selected system operator instances can also cause the selected system operator instances to allocate a new external part of the security code through this access authorization in this manner in order to replace a lost security code.

According to a further embodiment of the invention, it can moreover be provided that for the creation of the security code by a logic module for the assignment of object identification data and user data of a specific standard instance, an internal key of the respective standard instance is created and forwarded to at least two selected system operator instances, and that the internal key of this standard instance and of the system operator instances is returned with one external key each encrypted to the object data database, and is filed there.

In this way, only the standard instance or at least two system operator instances can jointly access the internal key through their external key, which in turn enables the decoding of the relationship between object identification data and user data of the respective standard instance. The system operator instances, which ideally have no knowledge of their reciprocal authorizations, can in case of a query only determine that they have been selected together with one or several other system operator instances for the purpose of decoding the internal key for a standard instance unknown to them through input of their external key and thus enable the access to the object identification data and the user data for this standard instance.

In the following, the invention is explained in detail by means of the exemplary embodiments depicted in the drawings. This hereby shows:

DETAILED DESCRIPTION OF THE DRAWINGS

Figure 1:
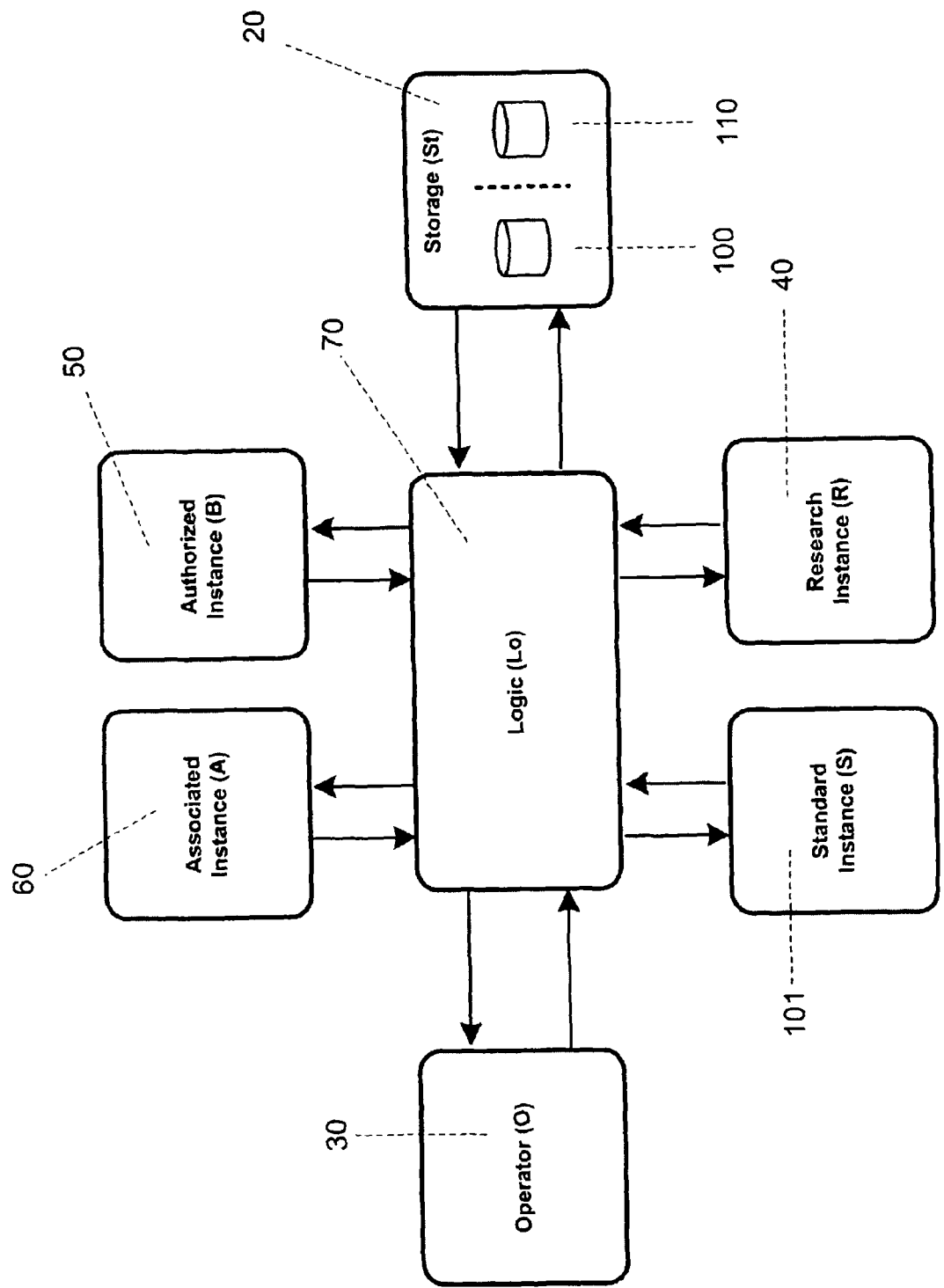
FIG. 1 is a block diagram of an embodiment of the data processing system according to the invention.

FIG. 1 shows a data processing system for processing of object data of a standard instance 101, which is illustrated to represent a person, a system, a data holder, or the like. In the example shown in FIG. 1, the standard instance 101 provides personal data as object data or extracts these from a personal data database 20 operated as an object data database in which the personal data can be stored or retrieved via a central logic 70. Data from a plurality of standard instances can be filed in the personal data database 20.

The processing of patient data shown as an example in a further sequence is not to be understood as limiting, but rather, also other types of data than those of patients, for example documents in a company, can be processed within the scope of the invention.

The personal data comprise object identification data, namely personal identification data 100 and associated user data 110, in which the personal identification data contain data that identify a person, e.g. a patient, thus such attributes as Social Security number, name, date of birth, place of residence, citizenship, etc.

Separate from these personal identification data, user data 110 are stored, which can comprise various entries and recorded medical history data, e.g. x-rays, mammography data, NMR data, which are needed for diagnosis and which can or must be stored for a specific period.

In FIG. 1, the access devices, which are represented by a plurality of input and output devices, communicate with a central logic 70, which is a control unit and therefore provides an interface between the personal data database 20 and instances 101, 60, 50 and 40, which store or retrieve personal data.

According to the invention the personal identification data 100 and the user data 110 in the personal data database 20 can be stored and retrieved separately from each other, so that no relationship between the object identification data and the user data can be derived from the stored data records alone. This can be achieved through the access control (logical) as well as through spatially separated (physical) provision of two databases.

The access to personal identification data 100 in connection with the associated user data 110 is only permitted after input of a security code, which has been allocated for the respective standard instance 101, which is identified by the personal identification data 100. If data is recorded for a standard instance 101, e.g. as part of an inquiry, then the standard instance 101 will receive a security code allocated by the data processing system according to the invention, which is completely or partially stored on a security token, such as on a Smartcard with PIN code or the like.

Consequently, the standard instance 101 can access its own user data 110 after input of the security code, while other standard instances are excluded from this access. It is therefore ensured that the stored data 110, e.g. case histories, cannot be related to a concrete standard instance 101 by outsiders.

As previously mentioned, further instances can be permitted in the data processing system as taught by the invention, for which other authorizations are possible. This way, for instance, a research instance 40 can be authorized, which has exclusive access to user data 110, for purposes of analysis. This can provide a sensible manner to access the user data 110 and use these for statistical investigations and studies, such as for improvement of the medical treatment or for diagnostic purposes, without having to reveal the identity of patients. By the complete separation of the personal identification 100 and the object data 110, conclusions from the user data 110 to the personal identification data 100 can be prevented, and the anonymity of the standard instances is safeguarded.

It can occur that the standard instance 101 loses or destroys its security token with the security code filed on it. To prevent the irretrievable loss of stored user data 110 of the respective standard instance 101, if the assignment of the personal data of the standard instance 101 to the user data were no longer available, one and/or several recovery instances outside of the object data database 20 can be defined for each of the standard instances.

The exemplary embodiment according to FIG. 1 contains several system operator instances 30 independent of each other as a recovery instance, from which two or several system operator instances for an assigned standard instance can be selected in each case, without that the selected system operator instances have knowledge of the identity of the respective other selected system operator instance(s) or the standard instances, where the security code allocated to the assigned standard instance 101 is accessible to at least two selected system operator instances, so that joint access to the personal identification data 100 in connection with the associated user data 110 for the assigned standard instance 101 is possible.

In order to ensure the independence of the at least two system operator instances, these are provided for each standard instance 101 at different locations and their reciprocal assignment is not disclosed to them.

If one of the selected system operator instances leaves the system, the security code and/or parts of the security code of the standard instance 101 can be created in advance and be passed onto another system operator instance.

In the method for the processing of object data according to the invention, in this case the personal data of a standard instance 101, the personal data are stored in the personal data database 20 in a storage step, and are accessed by a query step to the personal data from the personal data database 20.

The personal identification data 100 and the user data 110 are stored separately from each other in the personal data database 20, so that they can be retrieved separately from the personal data database 20. However, as already previously mentioned, no relationship between the personal identification data 100 and the user data 110 can be derived from the stored data sets alone.

Moreover, in the allocation step, security codes are allocated to each of the standard instances 101 and a recovery instance is defined for each standard instance 101, in which two or several system operator instances are selected from several reciprocally independent system operator instances 30, without revealing the identity of the respective other selected system operator instance(s) as well as the standard instance 101 itself to the selected system operator instances, whereby the security code of the respective standard instance 101 is at least partially also allocated to the two or several selected system operator instances.

The provision of a recovery instance is not mandatory, but protects against a complete loss of data for a standard instance 101, should the associated security code be lost.

In the query step, the personal identification data 100 in connection with the associated user data 110 are accessed through the standard instance after input of a security code, and the personal identification data 100 in connection with the associated user data 110 are accessed through the two or several system operator instances, if necessary, after the joint input of the security code.

The security code or part thereof remains with the standard instance 101 and further authorized instances 50 or associated instances 60 are authorized by the standard instance 101, if necessary, and is available to the at least two selected system operator instances 30 for common access during the use of the system operators as one of the optional recovery instances.

Different instances can be defined in a development of the data processing system according to the invention, e.g. a standard instance, an associated instance and an authorized instance.

At the same time, the standard instance is the owner of the user data and has unlimited rights to permit other persons or instances access to the user data. The associated instance is authorized by the standard instance and also has unlimited access to all data of the standard instance and also may be granted the right to authorize further instances. On the other hand, the authorized instance is only authorized to access the defined entries in the database 20, in accordance with the authorization through the standard instance or the associated instance. Moreover, the associated instance can be used as a recovery instance.

Figure 2:
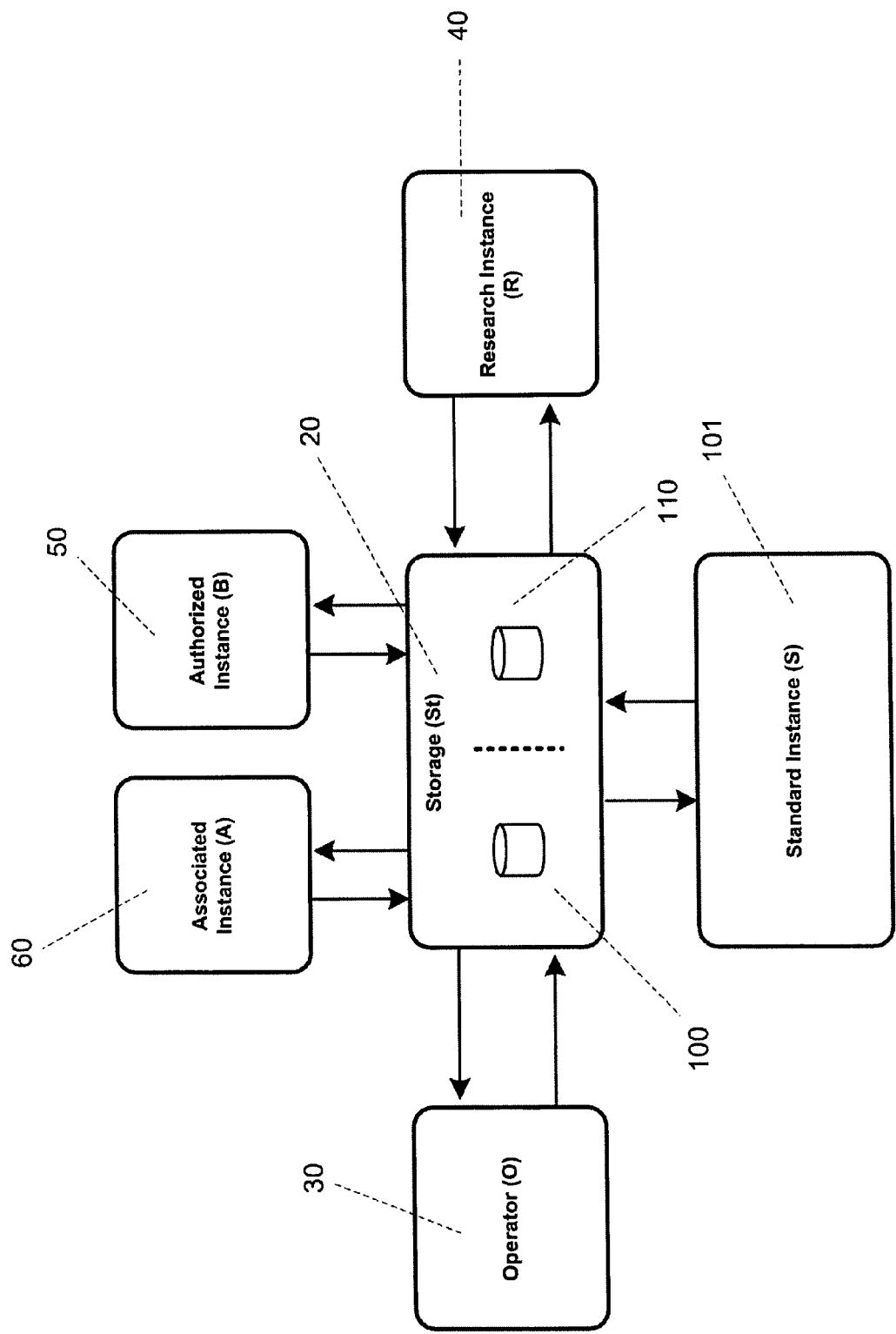
FIG. 2 is a block diagram of a further embodiment of the data processing system according to the invention.

In the exemplary embodiment according to FIG. 2, the system components are arranged so that the respective instances 101, 50, 60 as well as 40 have access to the object data database 20, without the interposed logic shown in FIG. 1. The logic is therefore implemented decentralized.

In order to create the security code, an internal key for the respective standard instance is generated by the decentralized logic on the access devices or the personal data database 20 for the assignment of personal identification data 100 and user data 110 of a specific standard instance 101, and is forwarded to the standard instance 101 and optionally to one or several recovery instances. The security code is encrypted by the standard instance 101 and the recovery instances with an external key in each case and is returned to the object data database 20, where it is filed.

The security code can be developed in two or several parts so that an external key remains with the standard instance which can then be used in order to access a next closest internal key and/or that this can be accessed through decoding. This next closest internal key can in turn access its own next closest internal key, etc. In this manner, access authorization can be determined in different ways, depending on the number of layers used.

In case of loss of the external key by the standard instance, a further instance can, e.g., be authorized to access the next closest internal key and/or make it accessible by decoding.

Figure 3:
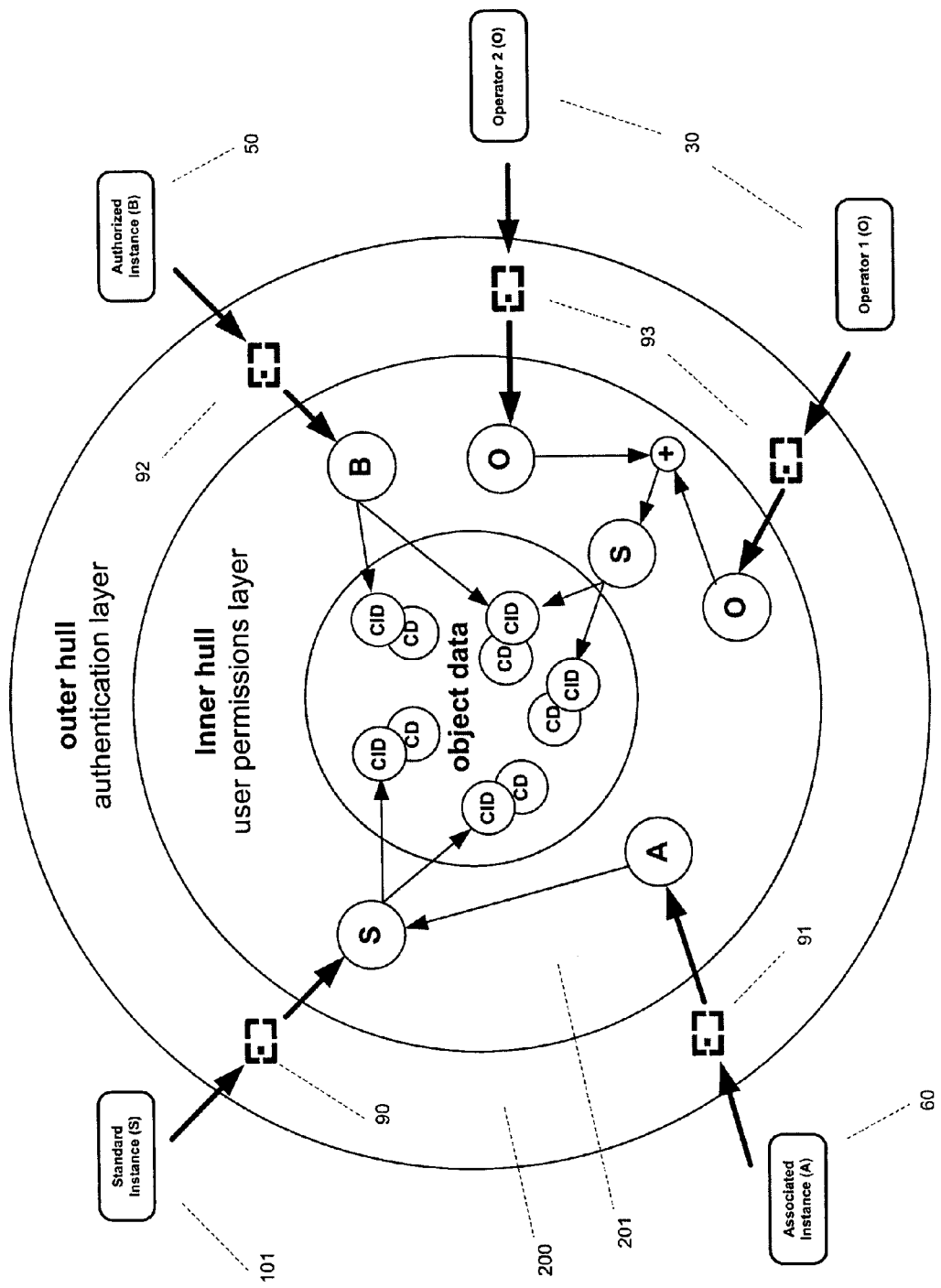
FIG. 3 shows a schematic representation of an access layer model in connection with the configuration of a security code.

FIG. 3 shows an access layer model for implementation of the invention. An external layer 200 and an inner layer 201 is developed.

The standard instance 101 enters the external key 90 of the external layer 200 and uses it to decode the internal key $K_{SO}^{-1}$ of the standard instance 101 in the inner layer 201, which in turn enables access to the user data CD of the standard instance 101 with the user data identification CID.

At the same time, the associated instance 60 has an external key 91 which decodes its internal key $K_{AO}^{-1}$, which hereby offers access to the internal key $K_{SO}^{-1}$ of the standard instance 101. If the standard instance 101 changes its internal keys, it can at any time prevent further access by the associated instance and the system operator instances. The external key of the standard instance can be retained in this case, however.

Both system operator instances 30 encode the internal key $K_{SO}^{-1}$ of the standard instance 101 with its respective internal keys $K_{SO}^{-1}$ which in turn is encoded through its external keys 93.

For the authorized instance 50, there is only authorization for access to certain data records by means of the external key 92 and the internal key $K_{AO}^{-1}$.

If an external and an internal key are referred to within the scope of the invention, these can be preferably developed from a private and a public key, which increases flexibility.

Figure 4:
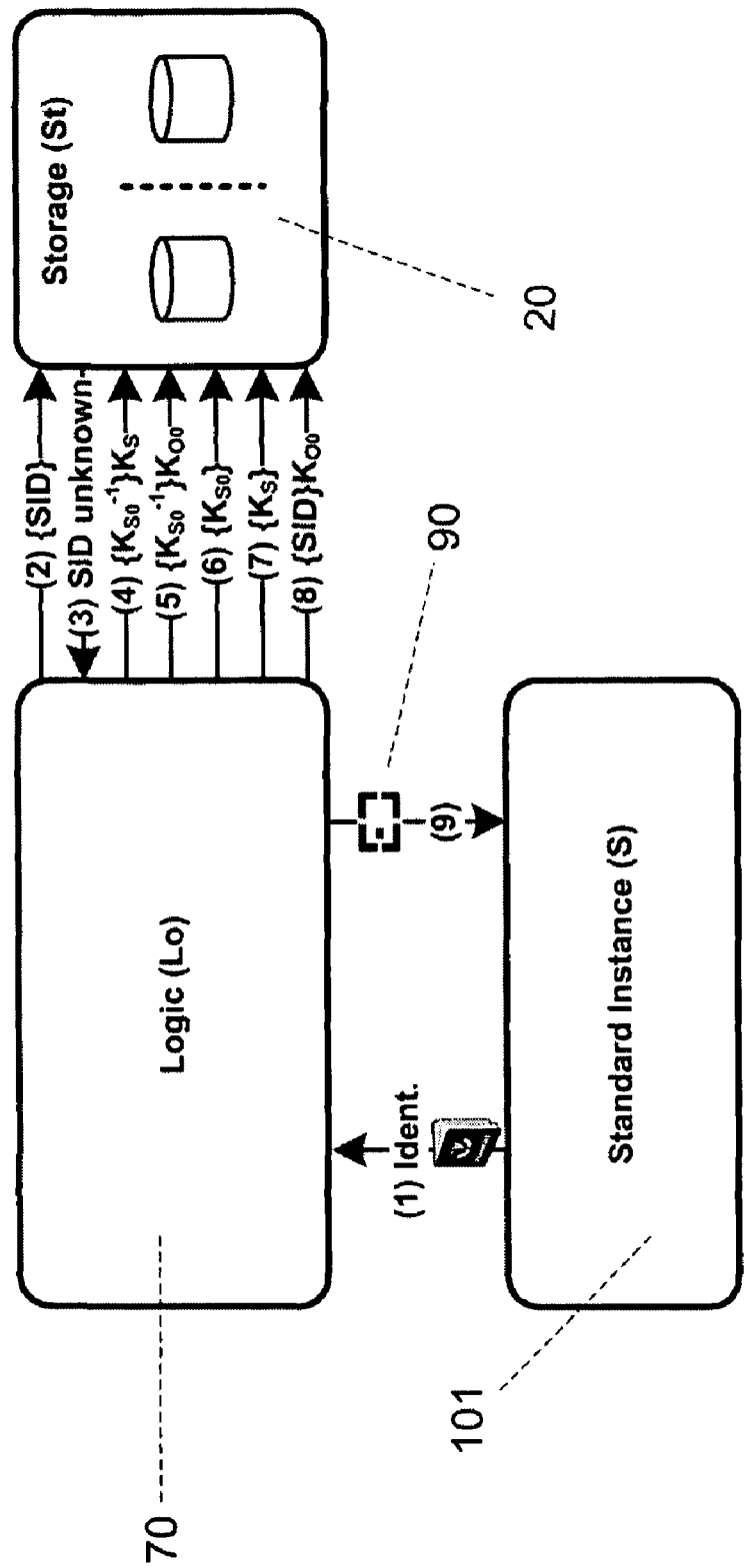
FIG. 4 shows the schematic sequence for allocation of a security code according to an embodiment of the method according to the invention.

FIG. 4 shows a sequence for the addition of a new standard instance 101 in the data processing system according to the invention. In this instance, the following steps are performed, which are schematically represented in FIG. 4.

Step (1): The new standard instance 101 identifies itself against the logic 70 and/or an authorized person.

Step (2): The personal identification data (SID) of standard instance 101 are transmitted from logic 70 to the database 20.

Step (3): Database 20 indicates that the specified SID is unknown.

Step (4): Logic 70 generates a new security code for the standard instance to be added, which comprises a pair of keys from an internal key as well as an external key, and transmits the private internal key $K_{SO}^{-1}$ encrypted with the external public key $K_S$ of standard instance 101 to database 20.

Step (5): Logic 70 transmits the inner private key $K_{SO}^{-1}$ of standard instance 101 successively encrypted with two or more inner public keys $K_{OO}$ of the system operator instances 30 to database 20. In this way, the inner private key $K_{SO}^{-1}$ of standard instance 101 is jointly available to the selected standard instances, if they use their internal private keys, in order to decode the inner private key $K_{SO}^{-1}$ of the standard instance 101.

A second possibility is to partition the inner private key $K_{SO}^{-1}$, for instance by the appliance of a threshold scheme, of the standard instance 101 and to store it encrypted with the respective public keys $K_{OO}$ of the system operator instances 30 in the database 20. A threshold scheme allows to define a subset of system operators 30 where each participant holds a part of the inner private key $K_{SO}^{-1}$ and moreover a defined number of system operator of this subset have to act together to allow reconstruction of the named key.

Step (6): Logic 70 transmits the inner public key $K_{SO}$ of the standard instance 101 to database 20. In this manner, data of standard instance 101 can be encrypted with key $K_{SO}$ if the standard instance is not present at the time of data creation.

Step (7): The logic 70 transmits the external public key $K_S$ of standard instance 101 to database 20.

Step (8): The logic 70 transmits a personal identification data (SID) of the standard instance 101 encrypted with the internal public keys $K_{OO}$ of the system operators 30 to database 20. Alternatively, logic 70 can also encrypt the connection between the selected system operators 30 and the related standard instance 101 by itself and so keep it secret.

Step (9): The logic 70 delivers the external private key 90 (e.g. for storage on a Smartcard) to the corresponding standard instance 101. The external key 90 is therefore part of the security code and is required for access to the internal key of the standard instance.

As soon as the security code has been allocated to the standard instance 101, it remains uniquely present for the entire life of the standard instance in the system, unless the standard instance 101 decides to change it.

Figure 5:
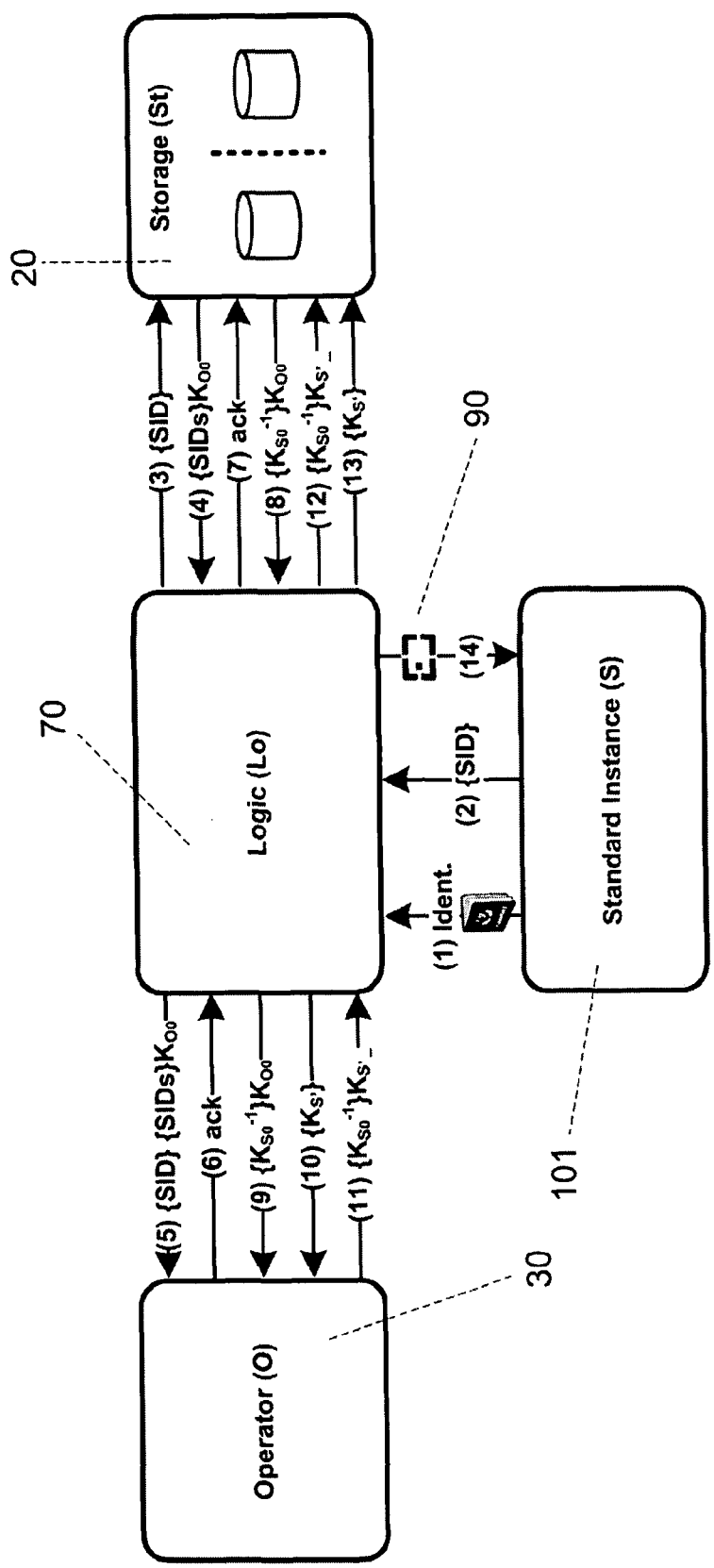
FIG. 5 shows the schematic sequence for issuance of an existing security code to an existing instance according to an embodiment of the method according to the invention.

FIG. 5 describes the sequence for issuance of a new external security code to an existing standard instance. At the same time, the following steps are performed, which are schematically represented in FIG. 5:

Step (1): The standard instance 101 authenticates itself against logic 70 and/or an authorized person.

Step (2): The standard instance 101 transmits its personal identification data (SID) to the logic 70.

Step (3): The logic 70 transmits the personal identification data (SID) of the standard instance 101 to the database 20.

Step (4): The database 20 responds with the transmission of all personal identification data (SIDs) allocated to system operators 30.

Step (5): The logic 70 transmits the required personal identification data (SID) of the standard instance 101 as well as the personal identification data (SIDs) allocated to the system operators 30 encrypted with the internal public key $K_{OO}$ of the respective system operator 30 to all system operators 30. These decode their allocated personal identification data (SIDs) with their internal private key $K_{OO}^{-1}$ and determine by comparison with the required personal identification data (SID) of standard instance 101, whether they are applicable for the respective standard instance 101.

Optionally, the allocated personal identification data (SIDs) can additionally be encrypted with the public key $K_{LO}$ of the logic. In this event, the system operators cannot determine whether they have been assigned to a standard instance 101. For this reason, the transmission of the single decoded allocated personal identification data (SIDs) to the logic 70 follows.

Step (6): The system operators 30 notify the logic 70 about their competency with respect to the standard instance 101.

Optionally, the system operators 30 can also decode the encrypted SIDs with the respective system operator key to the logic 70, which, however, is still encrypted with the public key $K_{LO}$ of logic 70. In this event, logic 70 decodes the SIDs with the private key $K_{LO}^{-1}$ of the logic 70 and determines by comparison with the required personal identification data (SID) of the standard instance 101, which system operator instances 30 have been assigned to which standard instance 101.

Step (7): The logic 70 transmits the list of the applicable system operators 30 to the database 20.

Step (8): The database 20 transmits the internal private key $K_{SO}^{-1}$ of the standard instance 101 sequentially encrypted with two or several public system operator instance 30 keys $K_{OO}$ to logic 70.

A second possibility is that the internal private key $K_{SO}^{-1}$ of the standard instance 101 was partitioned (e.g., by the appliance of a threshold scheme) and is transmitted encrypted with the respective public keys $K_{OO}$ of the system operator instances 30.

Step (9): The logic 70 transmits the internal private key $K_{SO}^{-1}$ of the standard instance 101 sequentially encrypted with two or several public keys $K_{OO}$ of the system operator instances 30 to respectively applicable system operator instances 30.

A second possibility is that the key $K_{SO}^{-1}$ of the standard instance 101 was partitioned and is transmitted encrypted with the respective public keys $K_{OO}$ of the system operator instances 30.

Step (10): The logic 70 transmits the new external public key $K_{S'}$ of the standard instance 101 to the respective applicable system operator instances 30.

Step (11): The respective applicable system operator instances 30 sequentially decode the internal private key $K_{SO}^{-1}$ of the standard instance 101 with its respective internal private keys $K_{OO}^{-1}$ and encrypt the internal private key $K_{SO}^{-1}$ of the standard instance 101 with the external public key $K_{S'}$ of the standard instance 101 and transmit same to logic 70. As an option, an encryption with the key $K_{LO}$ of the logic 70 could have been performed, in order to keep the keys secret also with respect to the system operator instances.

A second possibility is to partition the internal private key $K_{SO}^{-1}$ of the standard instance 101 and to store it with the respective public keys $K_{OO}$ of the system operator instances 30 encrypted in the database 20.

Step (12): The logic 70 delivers the internal private key $K_{SO}^{-1}$ of the standard instance 101 encrypted with the new external public key $K_{S'}$ of the standard instance 101 to the database 20.

Step (13): The logic 70 replaces the previously valid external public key $K_S$ of the standard instance 101 with the new external public key $K_{S'}$ of the standard instance 101.

Step (14): The logic 70 delivers the external private security token 90 (e.g. Smartcard) to the corresponding standard instance 101.

For the entry of user data 101 in the personal data database 20, further security codes are generated, which are encrypted with the internal public key of the standard instance, where these further security codes are encrypted with the internal public key of the authorized instance, if necessary.

In this manner, no direct relationship between the user data 110 and the standard instance 101 can be established by drawing conclusions about certain characteristics of the standard instance 101, e.g. about the course of an illness. This will effectively prevent the creation of profiles of standard instances. The further security code is preferably changed periodically or after a specific number of user data entries.

Figure 6:
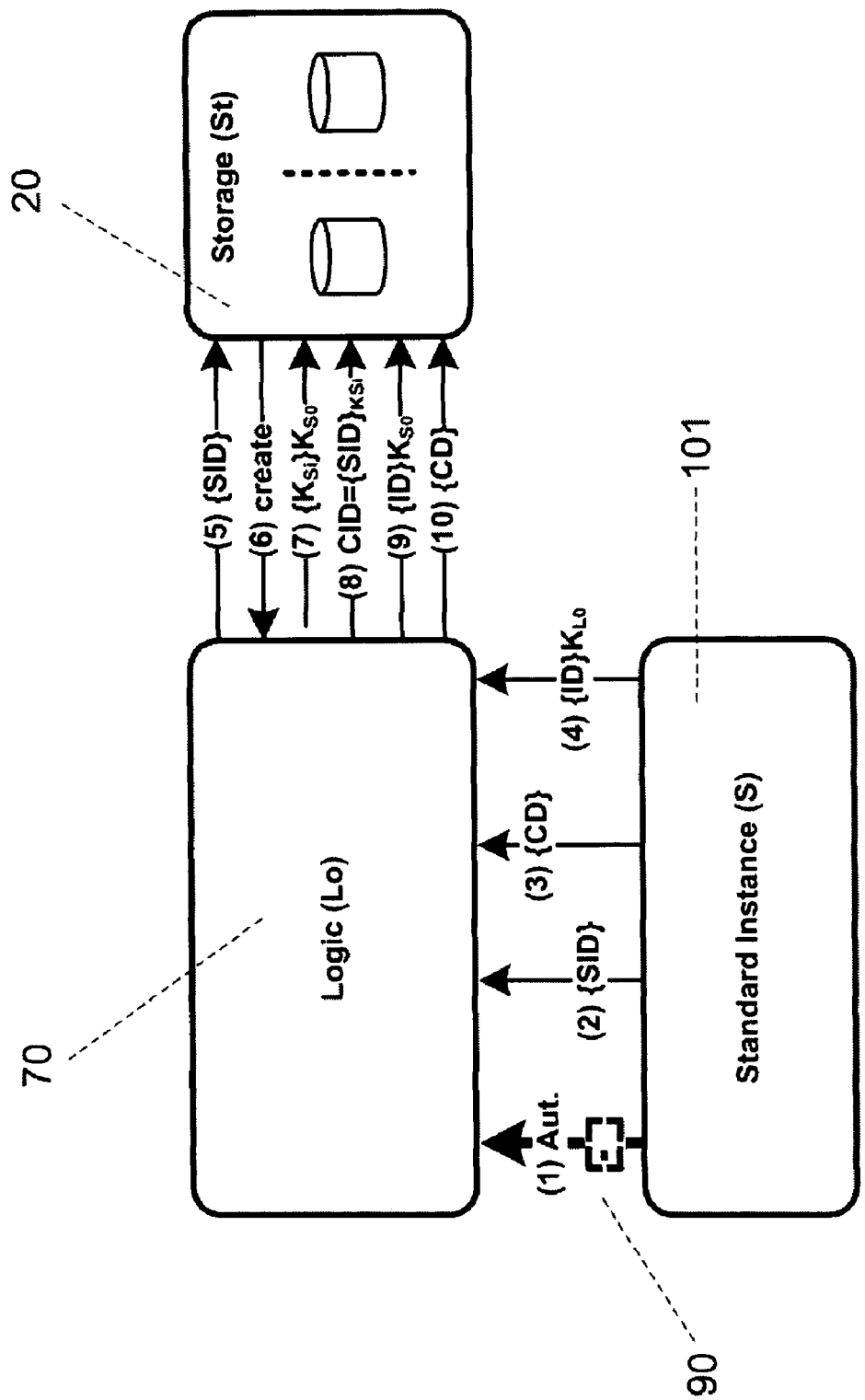
FIG. 6 shows the schematic sequence for the addition of new user data according to an embodiment of the method according to the invention.

FIG. 6 describes the procedure for adding new user data. At the same time, the following steps are performed, which are schematically represented in FIG. 6:

Step (1): The standard instance 101 logs onto the system by entering the security code, e.g. by entering a PIN code, in order to authenticate itself against its Smartcard 90.

Step (2): The standard instance 101 transmits its personal identification data (SID) to the logic 70. In the same step, also the public key of logic 70 $K_{LO}$ is provided to the Standard instance 101.

Step (3): The standard instance 101 transmits new user data (CD) to the logic 70.

Step (4): The standard instance 101 transmits an indicative identifier ID (e.g. key terms, date, etc.) encrypted with the public key of the logic $K_{LO}$ to the logic 70.

Step (5): The logic transmits the personal identification data (SID) of the standard instance 101 to the database 20.

Step (6): Database 20 informs logic 70, if a new key must be created.

Step (7): Logic 70 creates a new user data key $K_{Si}$ and encrypts the same with the internal public key $K_{SO}$ of the standard instance 101 and transmits this to the database 20.

Step (8): Thereafter, logic 70 encrypts the personal identification data (SID) of the standard instance 101 with the user data key $K_{Si}$ and transmits these to database 20. This attribute is designated as the user identification code (CID).

Step (9): Thereafter, logic 70 decodes the selected indicative identifier (e.g. key terms, date, etc.) of the standard instance 101 with the private key of the logic $K_{LO}^{-1}$ and encrypts the identifier (ID) with the internal public key $K_{SO}$ of standard instance 101.

Step (10): Finally, logic 70 transfers the user data (CD) to database 20 and links it to the previously formed identification data.

Figure 7:
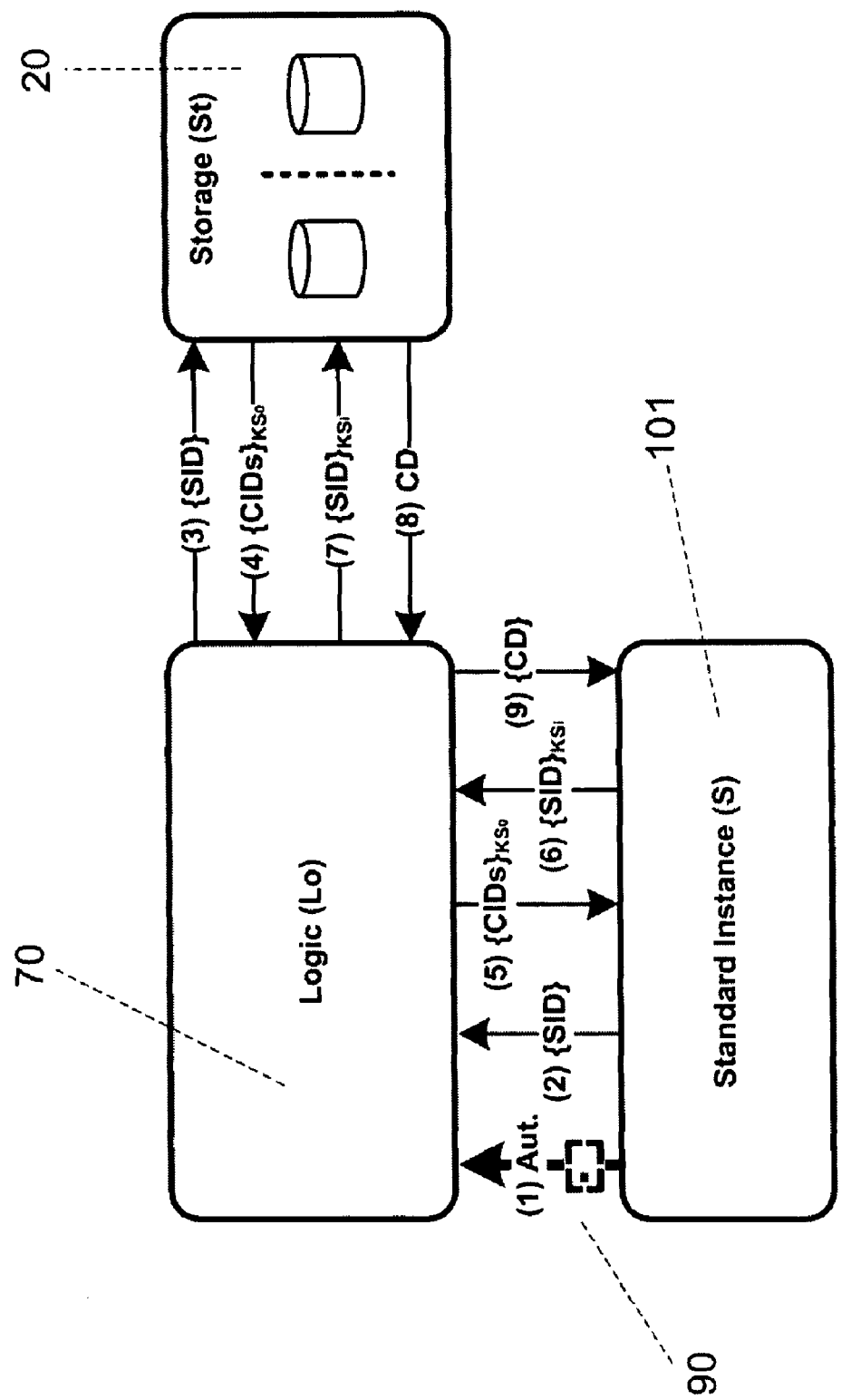
FIG. 7 shows the schematic sequence for reading of existing user data according to an embodiment of the method according to the invention.

FIG. 7 describes the procedure for reading existing user data. Hereby performed are the following steps, which are schematically represented in FIG. 7:

Step (1): The standard instance 101 logs onto the system by entering the security code, e.g. by entering a PIN code, in order to authenticate itself against its Smartcard 90.

Step (2): The standard instance 101 transmits its personal identification data (SID) to the logic 70.

Step (3): The logic 70 transmits the personal identification data (SID) of the standard instance 101 to the database 20.

Step (4): The database 20 transmits all indicative identifiers (CIDs) encrypted with the internal public key $K_{SO}$ of the standard instance 101 to the logic 70.

Step (5): The logic 70 transmits all indicative identifiers (CIDs) encrypted with the internal public key $K_{SO}$ of the standard instance to the standard instance 101.

Step (6): The standard instance 101 decodes its internal private key $K_{SO}^{-1}$ with its external private key $K_{S}^{-1}$. Subsequently, it uses its internal private key $K_{SO}^{-1}$, in order to decode the encrypted indicative identifiers (CIDs) and select an identifier (ID) as well as an associated user data key $K_{Si}$. Thereafter, it encrypts its personal identification data (SID) with the user data key $K_{Si}$ associated with the corresponding indicative identifier and transmits the resulting user data identification code (CID) to the logic 70.

Step (7): The logic 70 transmits the user data identification code to the database 20.

Step (8): The database 20 transmits the corresponding user data to the logic 70.

Step (9): The logic forwards the user data to the standard instance 101.

Figure 8:
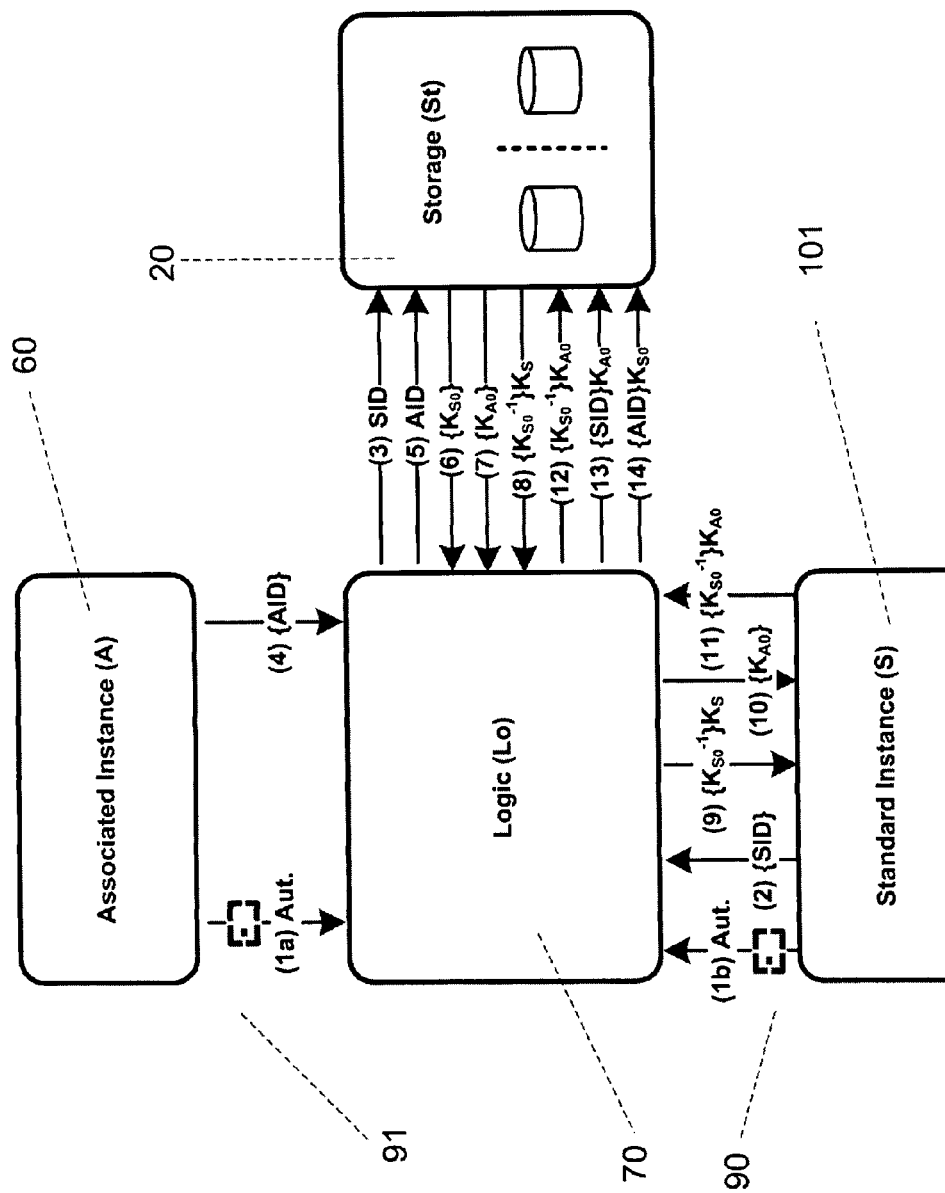
FIG. 8 shows the schematic sequence for adding an associated instance according to an embodiment of the method according to the invention.

FIG. 8 describes the procedure for adding an associated instance. At the same time, the following steps are performed, which are schematically represented in FIG. 8:

Step (1a, 1b): The standard instance 101 and the associated instance 60 log onto the system by entering the security code, e.g. by entering a PIN code, in order to authenticate themselves against their Smartcards 90 and 91.

Step (2): The personal identification data (SID) of the standard instance 101 are transmitted from the standard instance 101 to the logic 70.

Step (3): The logic 70 transmits the personal identification data (SID) of the standard instance 101 to the database 20.

Step (4): The associated instance 60 transmits its personal identification data (AID) to the logic 70.

Step (5): The logic 70 transmits the personal identification data (AID) of the associated instance 60 to the database 20.

Step (6): The database 20 transmits the internal public key $K_{SO}$ of the standard instance 101 to the logic 70.

Step (7): The database 20 transmits the internal public key KAO of the associated instance 60 to the logic 70.

Step (8): The database 20 transmits the internal private key $K_{SO}^{-1}$ of the standard instance 101 encrypted with the external public key $K_S$ of the standard instance 101 to the logic 70.

Step (9): The logic 70 forwards the internal private key $K_{SO}^{-1}$ of the standard instance 101 encrypted with the external public key $K_S$ of the standard instance 101 to the standard instance 101.

Step (10): The logic 70 transmits the internal public key KAO of the associated instance 60 to the standard instance 101.

Step (11): The standard instance 101 decodes its internal private key $K_{SO}^{-1}$ with its external private key $K_{S}^{-1}$ and encrypts its internal private key $K_{SO}^{-1}$ with the internal public key $K_{AO}$ of the associated instance 60 and transmits the same to logic 70.

Step (12): The logic 70 forwards the internal private key $K_{SO}^{-1}$ encrypted with the internal public key $K_{AO}$ of the associated instance 60 to the database 20.

Step (13): The logic 70 transmits the personal identification data (SID) of the standard instance 101 encrypted with the internal public key KAO of the associated instance 60 to database 20.

Step (14): The logic 70 transmits the personal identification data (AID) of the associated instance 60 encrypted with the internal public keys $K_{SO}$ of the standard instance 101 to database 20.

Figure 9:
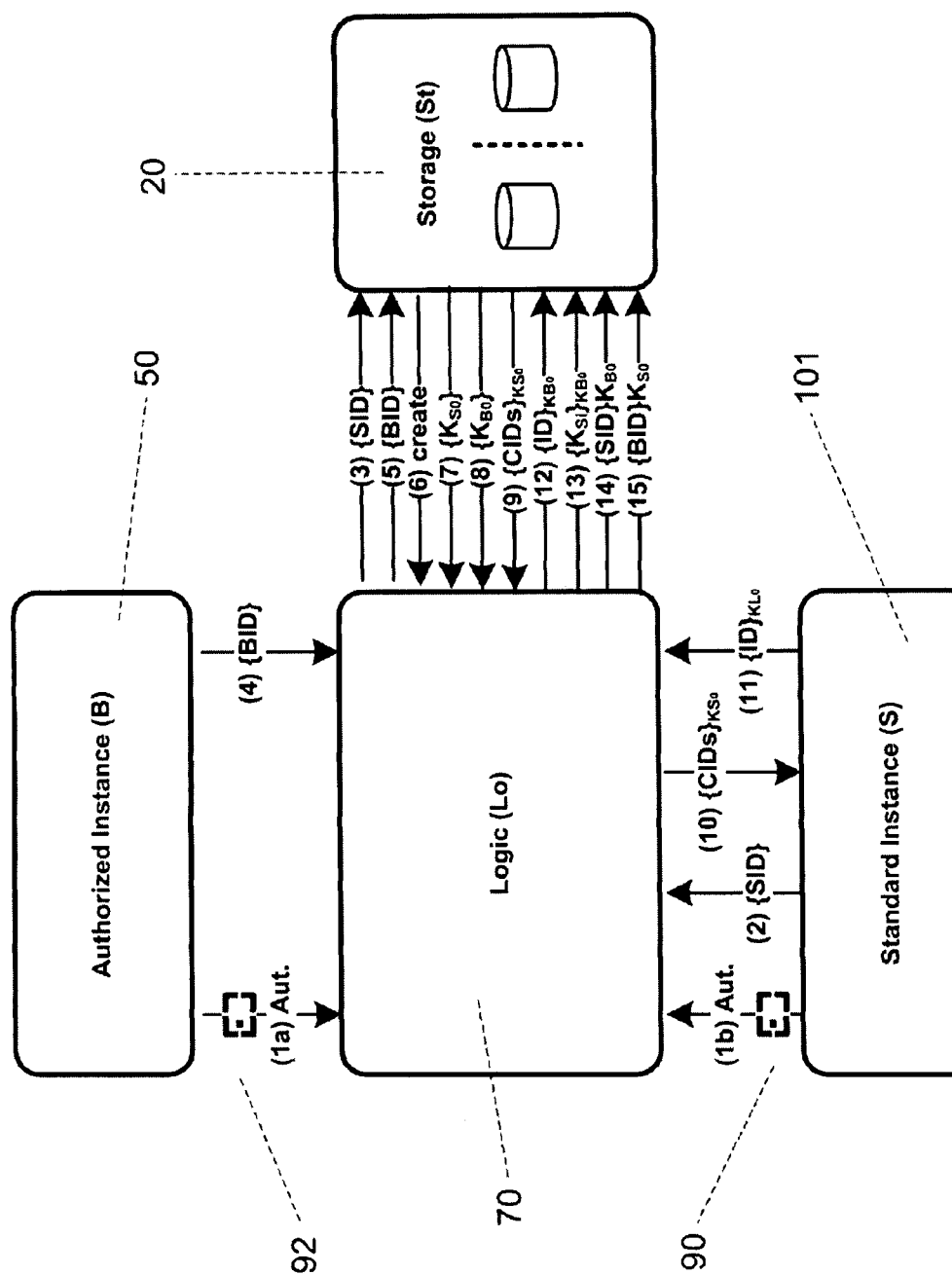
FIG. 9 shows the schematic sequence for adding an associated instance according to an embodiment of the method according to the invention.

FIG. 9 describes the procedure for adding an authorized instance 50. This involves the following steps, which are schematically represented in FIG. 9.

Step (1): The standard instance 101 and the authorized instance 50 log onto the system by entering the security token, e.g. by entering a PIN code, in order to authenticate themselves against a Smartcard 90 and 92. In the same step, the public key of the logic $K_{LO}$ is also disclosed to the standard instance 101.

Step (2): The personal identification data (SID) of the standard instance 101 are transmitted from the standard instance to the logic 70.

Step (3): The logic 70 forwards the personal identification data (SID) of the standard instance 101 to the database 20.

Step (4): The authorized instance 50 transmits its personal identification data (BID) to the logic 70.

Step (5): The logic forwards the personal identification data (BID) of the authorized instance 50 to the database 20.

Step (6): Database 20 informs logic 70, if a new key must be created.

Step (7): The database 20 transmits the internal public key $K_{SO}$ of the standard instance 101 to the logic 70.

Step (8): The database 20 transmits the internal public key $K_{BO}$ of the authorized instance 50 to the logic 70.

Step (9): The database 20 transmits all indicative identifiers (CIDs) encrypted with the internal public key $K_{SO}$ of the standard instance 101 to the logic 70.

Step (10): The logic 70 transmits all indicative identifiers (CIDs) encrypted with the internal public key $K_{SO}$ of the standard instance 101 to the standard instance 101.

Step (11): The standard instance 101 transmits an indicative identifier ID including associated user data key $K_{Si}$ (e.g. key terms, date, etc.) encrypted with the public key of the logic $K_{LO}$ to the logic 70.

Step (12): Thereafter, logic 70 decodes the selected indicative identifier (e.g. key terms, date, etc.) of the standard instance 101 with the private key of the logic $K_{LO}^{-1}$ and encrypts the identifier (ID) with the internal public key $K_{BO}$ of authorized instance 50 and transmits it to database 20.

Step (13): Subsequently, logic 70 encrypts the selected user data key $K_{Si}$ with the internal public key $K_{BO}$ of the authorized instance 60 and transmits it to database 20.

Step (14): The logic 70 transmits the personal identification data (SID) of the standard instance 101 encrypted with the internal public key $K_{BO}$ of the authorized instance 50 to database 20.

Step (15): The logic 70 transmits the personal identification data (BID) of the authorized instance 50 encrypted with the internal public key $K_{SO}$ of the standard instance 101 to database 20.

The invention claimed is:

1. A data processing system for processing object data of a plurality of standard instances, wherein the object data comprise object identification data and associated user data, comprising:

an object data database, in which the object data are stored and retrieved via access devices, wherein the object identification data and the user data in the object data database are stored and retrieved separately from each other, so that no relationship between the object identification data and the user data is stored in the stored data records alone, and at least one input device which after input of an assigned security code allocated for the standard instances permits access to the object identification data of the assigned standard instance and to the associated user data, wherein for each of the standard instances at least one assigned recovery instance is defined, wherein the assigned at least one recovery instance is provided with sufficient information to create the security code again if the security code is lost, and wherein the security code or a part thereof remains with the standard instance and in addition remains with or accessible to the assigned recovery instance(s) and/or with or accessible to further instances specified by the standard instance.

2. A data processing system according to claim 1, wherein several system operator instances which are independent of each other are present, from which two or several system operator instances are defined for one of the standard instances as the recovery instance assigned to said one of the standard instances, without that the identity of the respective other selected system operator instance(s) and the standard instance(s) is known to the selected system operator instance (s), where at least two of the selected system operator instances jointly have sufficient information to access the object identification data in conjunction with the associated user data for the respective standard instance.

3. A data processing system according to claim 1, wherein further instances are defined, which are authorized by the standard instances for full or partial data access.

4. A data processing system according to claim 3, wherein the further instances comprise one or more associated instances, which are respectively authorized by one of the standard instances and may have the same access authorization as these and therefore may authorize further instances if permitted by the standard instance.

5. A data processing system according to claim 4, wherein the associated instances are defined as recovery instances.

6. A data processing system according to claim 4, wherein the further instances comprise one or more authorized instances, which respectively are authorized by one of the standard instances to access predetermined entries in the object data database, wherein the system enables any data assigned to the standard instance to be defined as said predetermined entries.

7. A data processing system according to claim 6, wherein the predetermined entries comprise patient or health data.

8. A data processing system according to claim 4, wherein the further instances comprise one or more research instances which exclusively for purposes of analysis have access to the user data.

9. A data processing system according to claim 1, wherein each entry with user data in the object data database has been assigned a user data identification.

10. A data processing system according to claim 1, wherein the security code or parts thereof is stored on a security token.

11. A data processing system according to claim 10, wherein the security token is a Smartcard which has a PIN code.

12. A data processing system according to claim 1, wherein the object data database comprises two separate databases, where the object identification data are stored in the one database and the user data in the other database.

13. A data processing system according to claim 1, wherein the object data database is a personal data database and the object identification data are personal data.

14. A data processing system according to claim 13, wherein the object identification data are patient medical data.

15. A data processing system according to claim 1, wherein the security code of each of the standard instances comprises one or more internal and one or more external keys, where the connection of the user data with the object identification data of the respective standard instance is achieved in that there is an innermost key with which the object identification data are encrypted, wherein the external key remains with the standard instances in each case and offers the possibility of accessing the internal key, and the internal key serves as an access option to the innermost keys.

16. A method for processing of object data of standard instances, which comprise object identification data and associated user data, in which the object data are saved in an object data database in one step, and a query step is used to access the object data from the object data database and retrieve them, wherein in the saving step, the object identification data and the user data are stored separately from each other so that they are separately retrievable from the object data database, but the stored data records alone do not record a relationship between the object identification data and the user data, an assignment step is used to allocate security codes to each of the standard instances in order to provide access to the object identification data and the associated user data for each of the respective standard instances, where a recovery instance is defined for each of the standard instances, wherein in case the security code is lost, the recovery instance has the capability of creating the recovery code again, each of the standard instances can permit further instances full or partial data access to object data associated with the respective standard instance, and in a query step through one of the standard instances or a recovery instance and/or one of the further instances after input of the security code or part thereof, the object identification data in conjunction with the associated user data are accessed.

17. A method according to claim 16, wherein for each standard instance two or more system operator instances from several system operator instances that are independent of each other are selected, without that the identity of the respective other selected system operator instance(s) is known to the selected system operator instances, the security code of the respective standard instance is also allocated to the two or more selected system operator instances, and is available for joint access to at least two of the selected system operator instances, and in the query step the object identification data in conjunction with the associated user data are accessed through the two or more system operator instances after joint input of the security code.

18. A method according to claim 17, wherein for the creation of a security code by logic for the allocation of object identification data and user data of a specific standard instance, an internal key of the respective standard instance is generated and is forwarded to at least two selected system operator instances, and wherein the internal key of the standard instance and of the system operator instances is returned encrypted with one internal key each to the object data database and is filed there.

19. A method according to claim 18, wherein for the entry of user data into the object data database a further security code is generated, which is encrypted with a security code of the standard instance and a security code of the selected system operator instances, where the further security code is encrypted with the internal key of the authorized and/or associated instance.

20. A method according to claim 16, wherein one of the further instances is defined as a recovery instance and in case of loss of the security code this further instance creates the lost security code again.

* * * * *